US006114016A

United States Patent [19]
Sasaki et al.

[11] Patent Number: 6,114,016

[45] Date of Patent: Sep. 5, 2000

[54] METHOD OF PUNCHING TEMPLATE FOR FORMING A BASE PLATE OF A TAPE CASSETTE

[75] Inventors: Kazuo Sasaki; Shuichi Kikuchi, both of Miyagi, Japan

[73] Assignee: Sony Corporation, Tokyo, Japan

[21] Appl. No.: 09/174,851

[22] Filed: Oct. 19, 1998

Related U.S. Application Data

[62] Division of application No. 08/898,510, Jul. 22, 1997, Pat. No. 5,983,761, which is a division of application No. 08/708,732, Sep. 5, 1996, Pat. No. 5,794,501.

[30] Foreign Application Priority Data

Sep. 7, 1995 [JP] Japan .................................... 7-229919

[51] Int. Cl.[7] ............................ B32B 23/02; G11B 23/02

[52] U.S. Cl. .......................... 428/192; 428/131; 360/132; 242/347; 206/389

[58] Field of Search .................................... 206/389, 455, 206/403; 428/131, 192, 542.8; 360/132, 131, 137; 242/159, 347

[56] References Cited

U.S. PATENT DOCUMENTS 4,097,006 6/1978 Saito ...................................... 242/199
4,651,876 3/1987 Tanuma et al. .......................... 206/387
5,340,528 8/1994 Machida et al. ..................... 265/328.7
5,372,770 12/1994 Machida ................................. 264/255
5,585,988 12/1996 Kutsukake et al. ..................... 360/132

*Primary Examiner*—Donald Loney
*Attorney, Agent, or Firm*—Frommer Lawrence & Haug, LLP.; William S. Frommer; Matthew K. Ryan

[57] ABSTRACT

A method for punching a template is provided comprising the steps of partially punching the template by applying a first punch to a first surface of the template to form a recessed portion thereof and by applying a first die to a second surface of the template to form a projected portion thereof, so as to produce a first shear plane connected with the first surface on a peripheral surface of the recessed portion and a second shear plane connected with the second surface on a peripheral surface of said projected portion; returning the projected portion so as to be substantially aligned with the recessed portion by holding the first surface and the second surface between a second punch and a second die; and fully punching the template by applying a third punch to the second surface and a third die to the first surface to as to produce a third shear plane connected with the second surface on a peripheral surface of the recessed portion and a fracture plane connected between the third shear plane and the first shear plane thereby causing a portion of the template to fully punched therefrom.

2 Claims, 10 Drawing Sheets

METHOD OF PUNCHING TEMPLATE FOR FORMING A BASE PLATE OF A TAPE CASSETTE

This application is a Divisional of prior application Ser. No. 08/898,510, filed Jul. 22, 1997, now U.S. Pat. No. 5,983,761, which is a Divisional of prior application Ser. No. 08/708,732, filed Sep. 5, 1996, U.S. Pat. No. 5,794,501.

FIELD OF THE INVENTION

The present invention relates to a method of punching a product in a predetermined shape from a template, and more particularly, to a method of punching a template made of a metal in a roll shape or a flat shape to form a base plate of a tape cassette. The present invention further relates to a base plate for a tape cassette which is formed by the punching method, and a tape cassette which utilizes the finished punched base plate.

BACKGROUND OF THE INVENTION

FIGS. 1 and 2 illustrate a method of punching a product in a predetermined shape from a template, and more particularly illustrate utilizing a press 101 to punch a template made of aluminum to form a base plate of a tape cassette. In FIG. 1, the press 101 includes a punch 102 and a die 103. In this method of punching the template, the template 104 is placed on the die 103 and the punch 102, applied to an upper surface 104*a* of the template 104, thereby forming a base plate 105.

This method of punching a template of FIG. 1 has been found to be disadvantageous as a result of forming the template 104 by a single punching operation, that is, the punch 102 is only applied to the upper surface 104*a* of the template 104.

As is shown in FIG. 2, in the base plate 105 punched from the template 104 by the punching operation of FIG. 1, a portion of the punched end surface 111 thereof connected with the upper surface 104*a* of the template 104 forms a shear plane 111*a*, and a portion of the punched end surface 111 connected with a lower surface 104*b* of the template 104 forms a fracture plane 111*b*. The shear plane 111*a* is brought into a so-called cut state by the punch 102, so as to be a smooth surface. On the other hand, the fracture plane 111*b* is brought into a so-called torn state, so as to become a coarse surface, and a punched flash 111*c* is formed in an end of the fracture plane 111*b* when it is torn off.

On the other hand, in a punched end surface 112 of the base plate 105 formed by punching the above-mentioned template 104 by the punching operation of FIG. 1, a portion of the punched end surface 112 connected with an upper surface 105*a* of the base plate 105 forms a shear plane 112*a*. Moreover, a portion of the punched end surface 112 connected with a lower surface 105*b* of the base plate 105 forms a fracture plane 112*b*. As a result of this punching operation, a punched flash 112*c* is formed in the fracture plane 112*b*, similar to the punched flash 111*c* in the punched end surface 111 of the template 104.

The punched flash 111*c* formed in the above-mentioned template 104 does not present a significant problem. However, the punched flash 112*c* in the base plate 105 can cause a person handling the base plate 105 to be injured, for example. Further, when a tape cassette is manufactured which incorporates the base plate 105, the punched flash 112*c* may damage hardware, i.e., a drive.

In order to alleviate the adverse effects of the above-mentioned punched flash 112*c*, a method of crushing the flash 112*c* by a punch 121, has been developed, as shown in FIGS. 3 through 5. In this method, however, the cost of the base plate is increased because the number of steps necessary to manufacture the base plate is increased. Further, there is a danger in the method of FIGS. 3 through 5 that the punched flash 112*c* can be stripped or dropped because the punched flash 112*c* is only crushed and is not removed.

For the foregoing reasons, it has been found desirable to provide a method for punching a template which prevents formation of such a punched flash.

OBJECTS AND SUMMARY OF THE INVENTION

Therefore, it is an object of the present invention to provide a method of punching a product in a predetermined shape from a template which avoids the aforementioned deficiencies of the prior art.

It is also an object of the present invention to provide a method of punching a template to form a base plate for a tape cassette.

It is a further object of the present invention to provide a method of punching a template to form a base plate for a tape cassette which prevents formation of a punched flash in the punched end surface of the template.

In accordance with an aspect of the invention, a method for punching a template is provided comprising the steps of partially punching the template by applying a first punch to a first surface of the template to form a recessed portion thereof and by applying a first die to a second surface of the template to form a projected portion thereof, so as to produce a first shear plane connected with the first surface on a peripheral surface of the recessed portion and a second shear plane connected with the second surface on a peripheral surface of the projected portion; returning the projected portion so as to be substantially aligned with the recessed portion by holding the first surface and the second surface between a second punch and a second die; and fully punching the template by applying a third punch to the second surface and a third die to the first surface, so as to produce a third shear plane connected with said second surface on the peripheral surface of the recessed portion and a fracture plane connected between the first shear plane and the third shear plane thereby causing a portion of the template to be completely punched therefrom wherein a punched flash is prevented when the portion to be punched is fully punched from the template as a result of the respective inner and outer peripheral surfaces of the template and the portion to be punched being rubbed against each other during the fully punched step.

In accordance with the another aspect of the present invention, a method of punching a template to form a base plate for a tape cassette is provided comprising the steps of partially punching a portion of the template from an upper surface thereof to a lower surface to form a partially punched base plate; returning the upper surface and lower surface of the partially punched template to the original position of the template; fully punching the base plate returned to the original position of the template from the lower surface thereof to the upper surface such that the base plate is fully punched from the template; returning the fully punched base plate to the original position of the template; and cutting off the fully punched base plate to discharge the base plate from the template.

Other objects, features and advantages of the present invention will become apparent from the following detailed description of illustrated embodiments when read in conjunction with the accompanying drawings in which corresponding components are identified by the same reference numerals.

BRIEF DESCRIPTION OF THE DRAWINGS

The following detailed description, given by way of example, but not intended to limit the invention solely to the specific embodiments described, may best be understood in conjunction with the accompanying drawings in which.

DETAILED DESCRIPTION OF CERTAIN PREFERRED EMBODIMENTS

Referring now to FIGS. 6 through 18 of the drawings, a method for punching a template according to the present invention is illustrated wherein a base plate for a tape cassette generally referred to as a data cartridge and used as an external storage medium of a computer is formed from the punched template.

Figure 1:
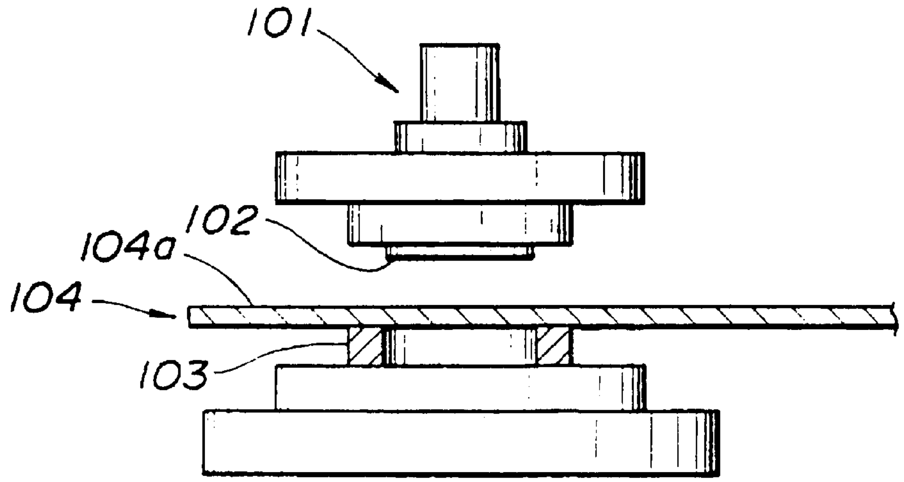
FIG.1 (PRIOR ART)
FIG. 1 is a cross-sectional view illustrating a method for punching a template.
Figure 2:
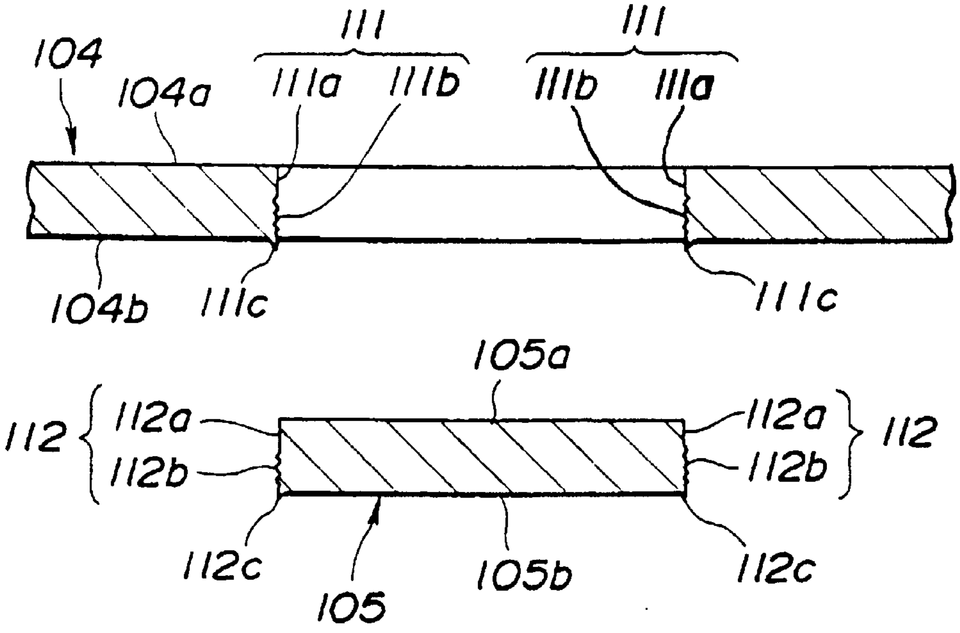
FIG.2 (PRIOR ART)
FIG. 2 is a cross-sectional elevational view illustrating a base plate for a tape cassette being formed by the punching method of FIG. 1.
Figure 3:
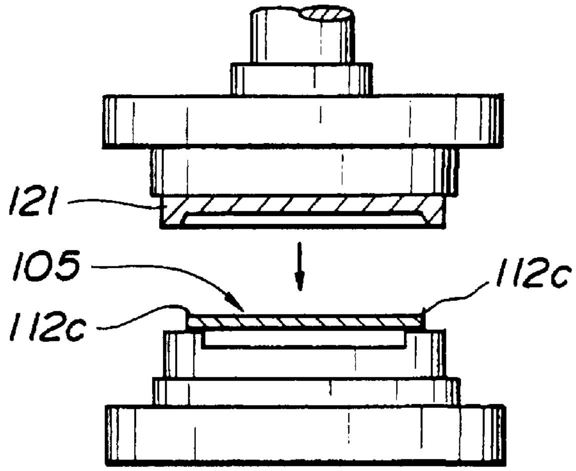
FIG.3 (PRIOR ART)
FIG. 3 is a cross-sectional elevational view of a method for punching a template specifically illustrating a punched flash crushing step.
Figure 4:
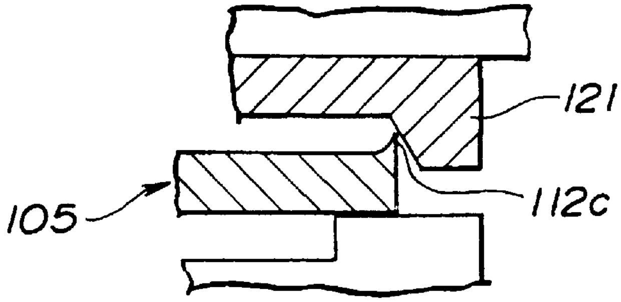
FIG.4 (PRIOR ART)
FIG. 4 is an enlarged cross-sectional view of the punch and die forming the punched flash of FIG. 3.
Figure 5:
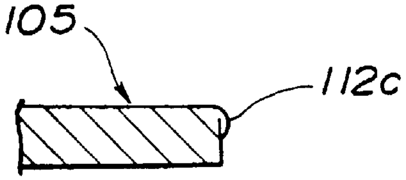
FIG.5 (PRIOR ART)
FIG. 5 is a cross-sectional elevational view specifically illustrating a method step of crushing the punched flash.
Figure 6:
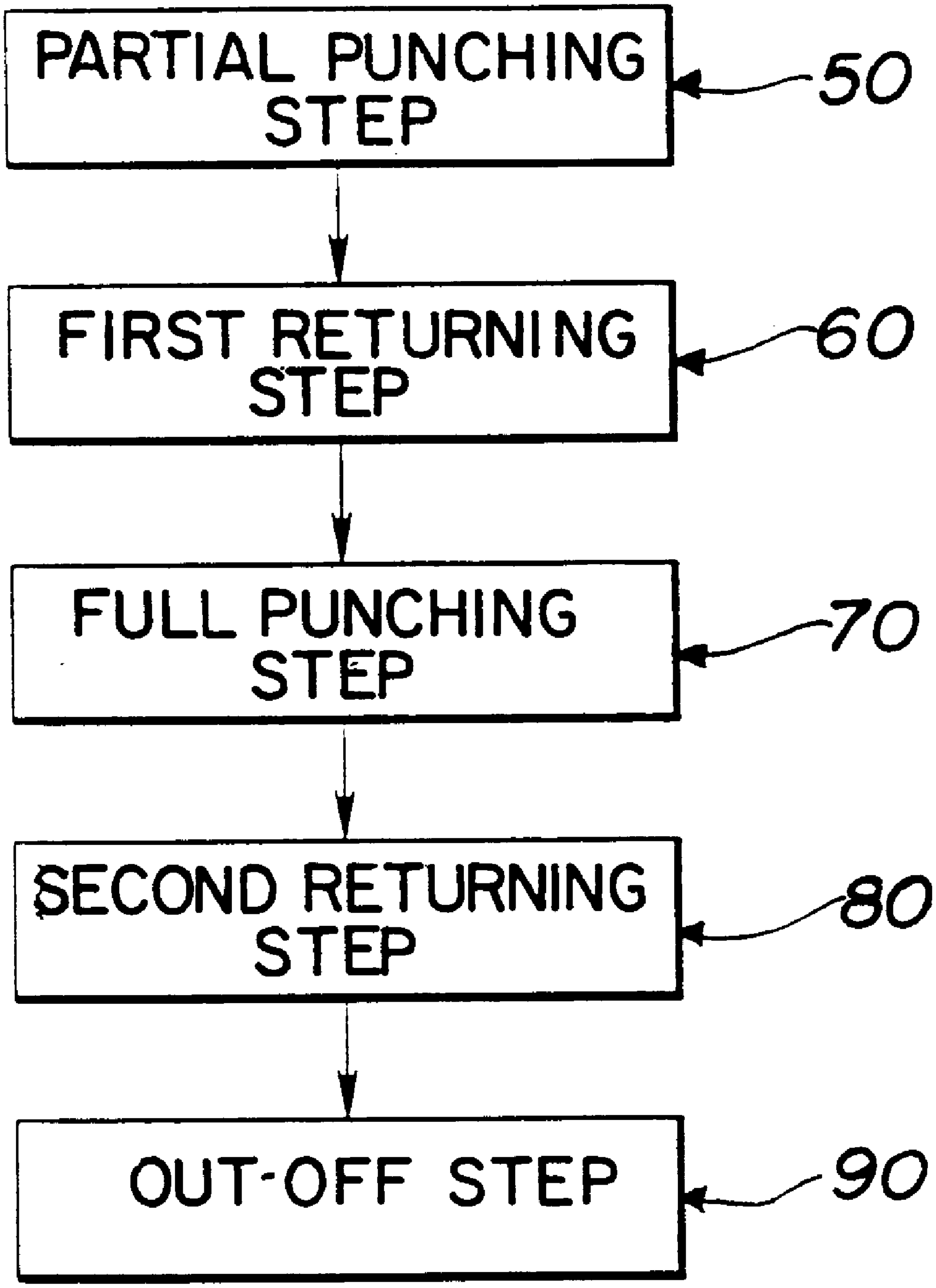
FIG. 6 is a flow chart representing a preferred embodiment of the method for punching a template in accordance with the teachings of the present invention.

FIG. 6 is a flow chart which represents a punching method according to the present invention. The punching method according to the present invention includes a partial punching step (an incomplete punching step) 50 for partially punching a base plate from a first surface of a template to a second surface thereof, a first returning step 60 for returning the base plate partially punched by the partial punching step to the original position on the side of the template, a full punching step (a complete punching step) 70 for fully punching the base plate returned to the original position of the template by the first returning step 60 from the second surface of the template to the first surface thereof, a second returning step 80 for returning the base plate fully punched by the full punching step to the original position on the first side of the template, and a cut-off step 80 for cutting off the base plate returned to the original position of the template by the second returning step by applying a force on the first surface of the template.

Figure 7:
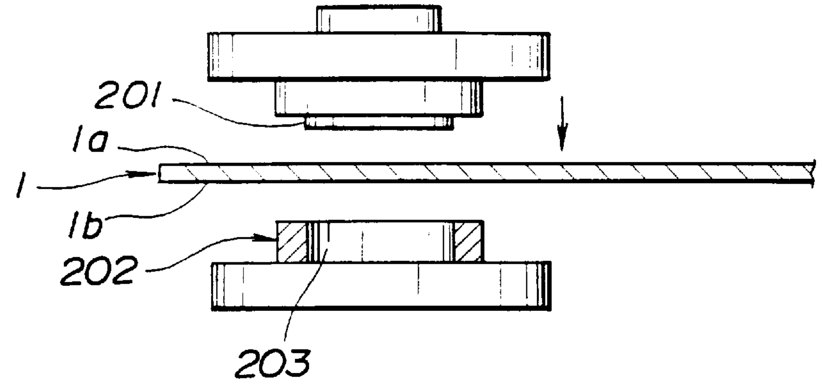
FIGS. 7 through 9 are cross-sectional elevational views illustrating the sequence of operation for the initial partial punching step of the method for punching a template of the present invention.
Figure 8:
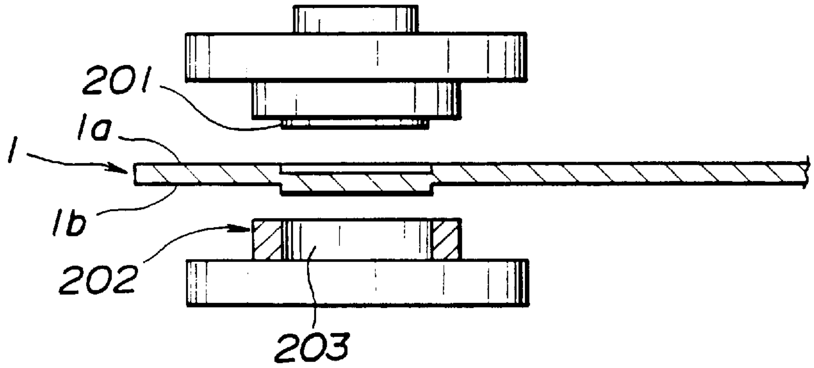

FIGS. 7 to 8 represent the partial punching step 50 of the method for punching a template of the present invention. The above-mentioned partial punching step is performed out using a first punch 201 and a first die 202. The first punch 201 is formed in approximately the same shape as that of a base plate which will be formed. Further, the first die 202 is provided with a die opening 203 slightly larger than the first punch 201.

The partial punching step is performed by placing a template 1 of the first die 202, pressing the first punch 201 into the template 1 on the side of its upper surface 1*a*, recessing the template 1 on the side of the upper surface 1*a* in the shape of the base plate by the first punch 201, and projecting the template 1 on the side of its lower surface 1*b* in the shape of the base plate.

Figure 9:
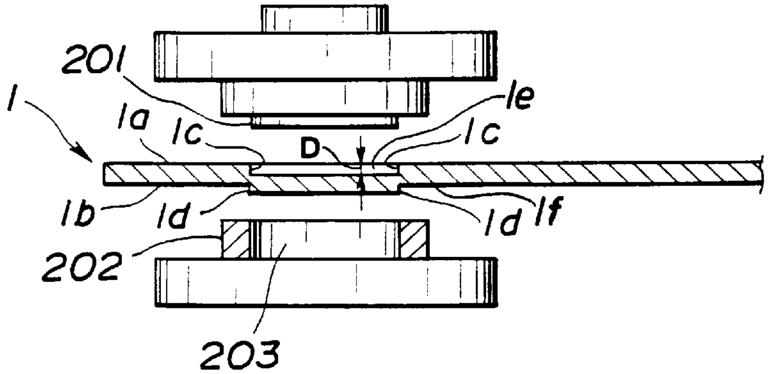

FIG. 9 is a cross-sectional view of the template 1 which is subjected to the above-mentioned partial punching step. A peripheral surface of a recessed portion on the side of the upper surface 1*a* of the template 1 is sheared when the first punch 201 is pressed into the template 1 on the side of the upper surface 1*a*, so as to procude a first shear plane 1*c* connected with the upper surface 1*a* of the template 1. As used herein, the term "projected portion" shall refer to the side surface of the template 1 which remains after the portion of the template forming the base plate is severed from the template.

On the other hand, a peripheral surface of a projected portion on the side of the lower surface 1*b* of the template 1 is sheared by the first die 202 when it enters the die opening 203 of the first die 202, so as to produce a second shear plane 1*d* connecting with the lower surface 1*b* of the template 1. As used herein, the term "projected portion" shall refer to the side surface of the portion of the template to be severed.

In order to prevent the base plate from being completely punched by the first punch 201 when the above-mentioned partial punching step 50 is performed, the position of a lower dead spot of the first punch 201 can be set that the depth D of the first shear plane 1*c* is a value which is approximately 70 to 95% of the depth of the shear plane where the base plate is completely punched.

Figure 10:
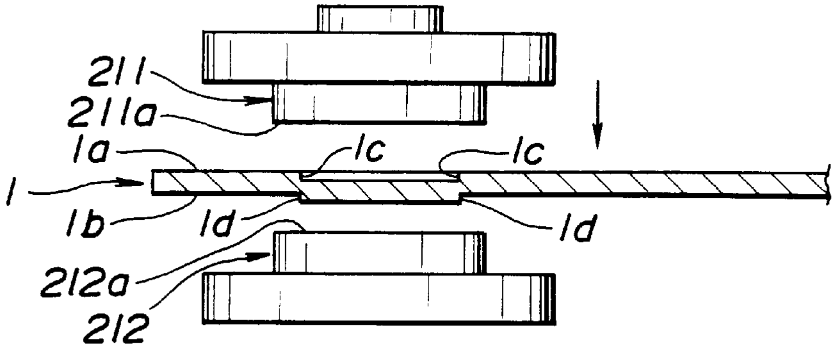
FIGS. 10 through 12 are cross-sectional elevational views illustrating the sequence of operation for the first returning step of the method for punching a template of the present invention.
Figure 11:
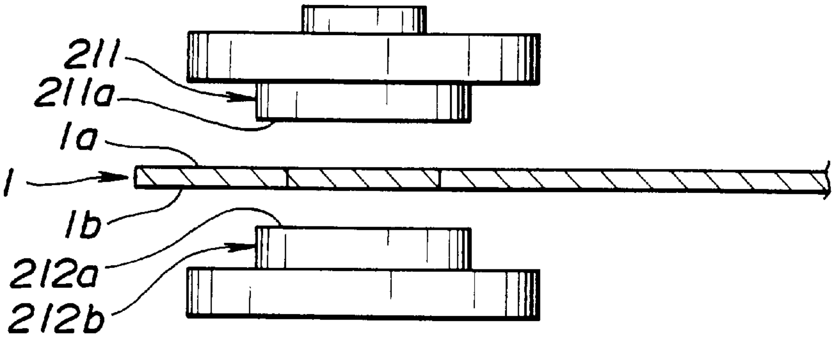
Figure 12:
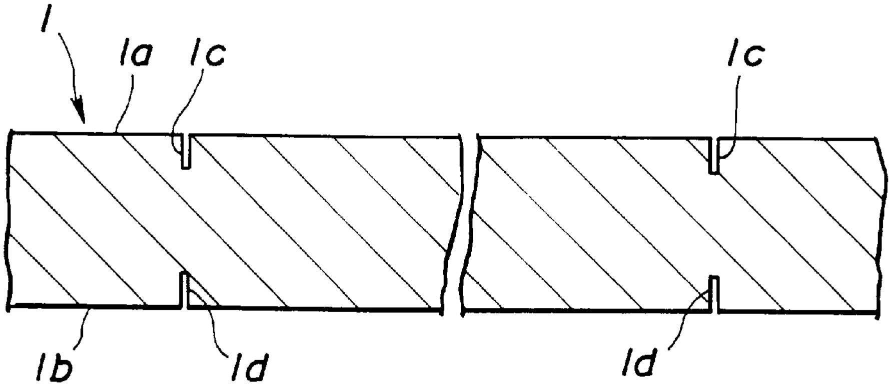

FIGS. 10 to 11 represent the first returning step 60 of the method of punching a template of the present invention. The above-mentioned first returning step 60 is performed using a second punch 211 and a second die 212. Surfaces 211*a* and 212*a*, which abut against the upper and lower surfaces 1*a* and 1*b* of the template 1, respectively of the second punch 211 and the second die 212 are formed into flat surfaces having a larger surface area than those of the above-mentioned recessed and projected portions of the template formed by the partial punching step. The projected portion is returned to the original position of the template 1, aligned with the recessed portion as shown in FIG. 12, with the upper surface 1*a* and the lower surface 1*b* of the template 1 held between the abutting surfaces 211*a* and 212*a* of the second punch 211 and the second die 212.

Figure 13:
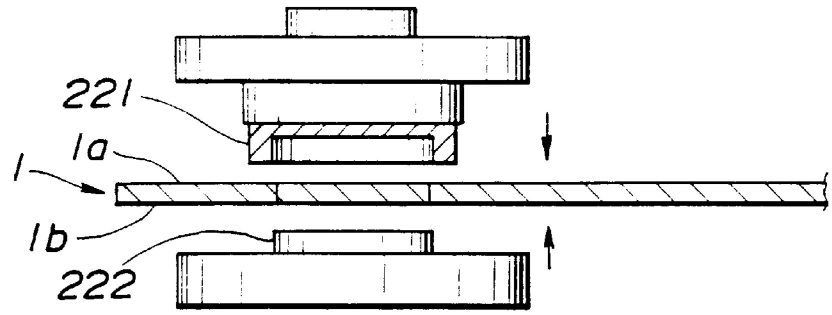
FIGS. 13 through 15 are cross-sectional elevational views illustrating the sequence of operation of the full punching step of the method for punching a template of the present invention.
Figure 14:
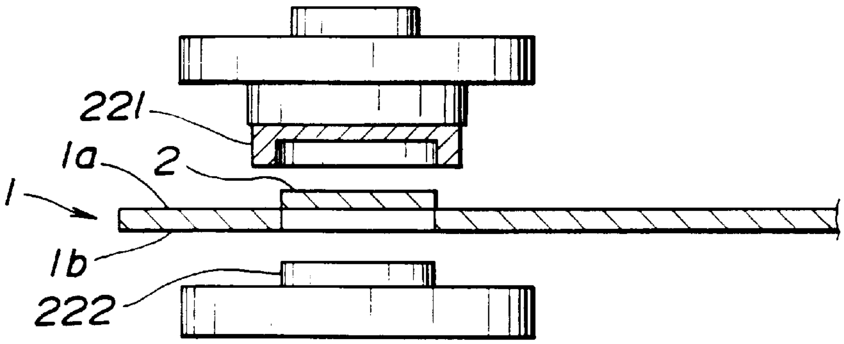

FIGS. 13 to 14 represent the full punching step 70 of the method of punching a template of the present invention. The above-mentioned full punching step 70 is performed using a third die 221 and a third punch 222. The third die 221 is formed in approximately the same shape as that of the first die 202 used in the above-mentioned partial punching step 50. Further, the third punch 222 is formed in approximately the same shape as that of the first punch 201.

The above-mentioned template 1 is placed on the third punch 222 in a condition wherein the position of the base plate which is partially punched in the above-mentioned partial punching step 50 and is returned to the original position in the first returning step 60 conforms to the position of the third punch 222, and the third die 221 is lowered toward the third punch 222 to press the template 1.

The third punch 222 is pressed into the template 1 on the side of the lower surface 1*b* by the above-mentioned pressing, to recess the template 1 on the side of the lower surface 1*b* and project the template 1 on the side of the upper surface 1*a*, thereby to cause a condition where the base plate 2 is fully punched from the template 1 (that is, a condition wherein the template is completely punched).

Figure 15:
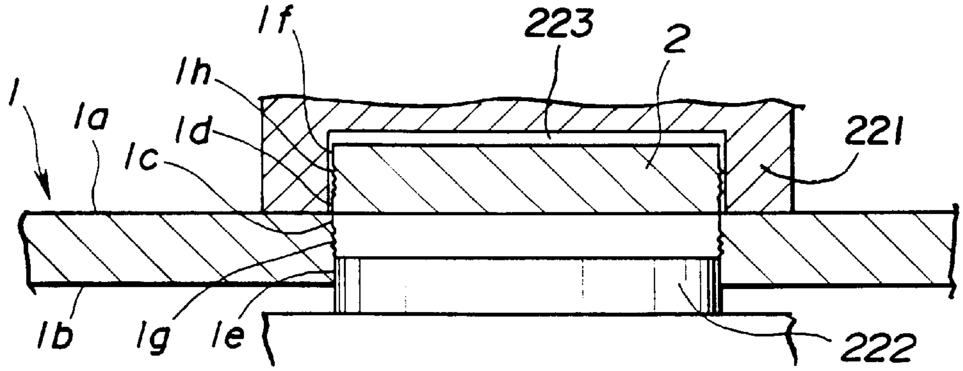

FIG. 15 is a cross-sectional view of the template 1 which is subjected to the above-mentioned full punching step 70. A peripheral surface of a recessed portion on the side of the lower surface 1*b* of the template 1 is sheared when the third punch 222 is pressed into the template 1 on the side of the lower surface 1*b*, so as to produce a third shear plane 1*e* connecting with the lower surface 1*b* of the template 1. On the other hand, a peripheral surface of a projected portion on the side of the upper surface 1*a* of the template 1 is sheared by the third die 221 when it is pressed into a die opening 223 of the third die 222, so as to produce a fourth shear plane 1*f*.

As described in the foregoing, when the third punch 222 is pressed into the template 1 on the side of the lower surface 1*b*, so that the depth of third shear plane 1*f* is not less than a predetermined value, a fracture plane 1*g* is naturally formed so as to connect with the third shear plane 1*e*, and the fracture plane 1*g* connects with the above-mentioned first shear plane 1*c*, thereby causing the base plate 2 to be completely punched from the template 1. In addition, a fracture plane 1*h* is formed between the second shear plane 1*d* and the fourth shear plane 1*f* of the base plate 2 which corresponds to the fracture plane 1*g* of the template 1.

Figure 16:
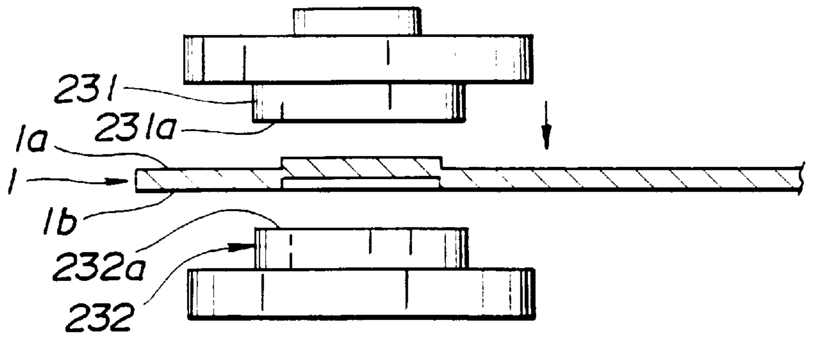
FIGS. 16 through 17 are cross-sectional elevational views illustrating the sequence of operation of the second returning step of the method for punching a template of the present invention.
Figure 17:
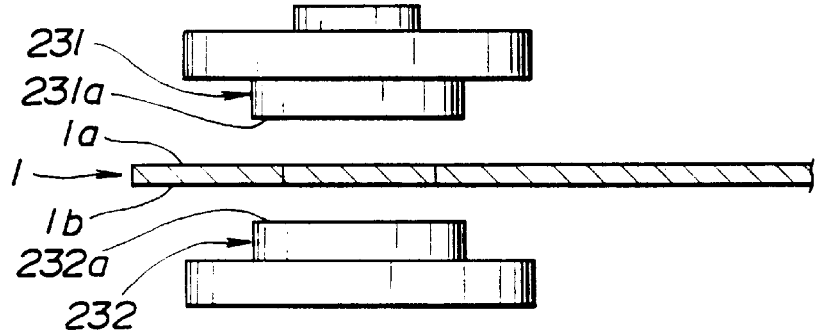

FIGS. 16 to 17 represent the second returning step of the method of punching a template of the present invention. The above-mentioned second turn step 70 is performed using a fourth punch 231 and a fourth die 232. The fourth punch 231 and the fourth die 232 are so constructed so as to return the base plate 2 into a punched hole of the template 1 with the lower surface of the template 1 and the upper surface of the base plate 2 held therebetween, substantial similar to the operation of the second punch 211 and the second die 212 of the above-mentioned first returning step 60.

Figure 18:
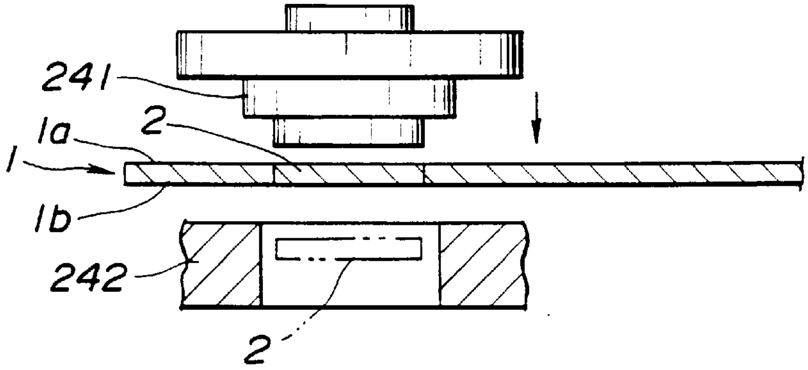
FIG. 18 is a cross-sectional elevational view illustrating the cut-off step of the method for punching a template of the present invention.

FIG. 18 represents the cut-off step 80 of the method of punching a template of the present invention. The above-mentioned cut-off step 90 is performed using a fifth punch 241 and a fifth die 242 for the cut-off operation. If the upper surface of the base plate 2 is returned to the punched opening of the template 1 formed by the above-mentioned second returning step 70, and is pressed by the fifth punch 241, the base plate 2 is discharged from the punched opening of the template 1, and is discharged downwardly from the template 1.

In the above-mentioned full punching step 70, a punched flash is formed in an end of the fracture plane 1*h* of the base plate 2. When the base plate 2 is moved in the recessed portion of the template 1, for example, the flash is brought into sliding contact with an inner peripheral surface of the recessed portion, so that the punched flash is removed by so-called rubbing. Also when the base plate 2 is returned to the punched opening of the template 1 in the second returning step 80, the flash is also brought into sliding contact with an inner peripheral surface of the punched opening, so that the punched flash is removed. Further, the punched flash is removed in the same rubbing manner in the cut-off step 90, whereby the punched flash is almost completely removed in the base plate 2 discharged and cut off from the template 1. The partial punching step 50, the first returning step 60, the full punching step 70, the second returning step 80, and the cut-off step 90 are performed in the same mold.

Figure 19:
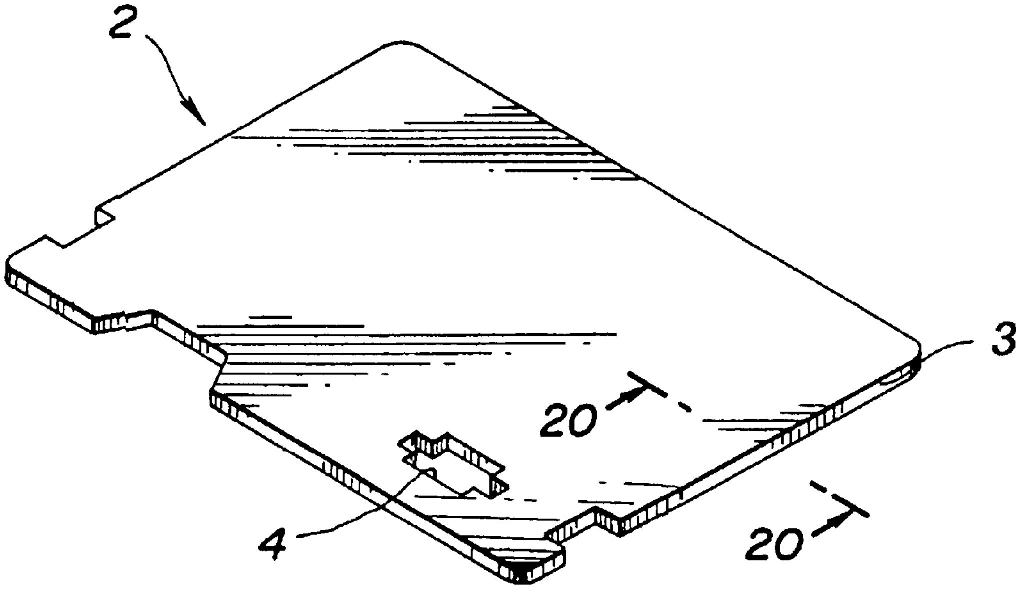
FIG. 19 is a front perspective view of a base plate formed by the method of punching a template of the present invention.
Figure 20:
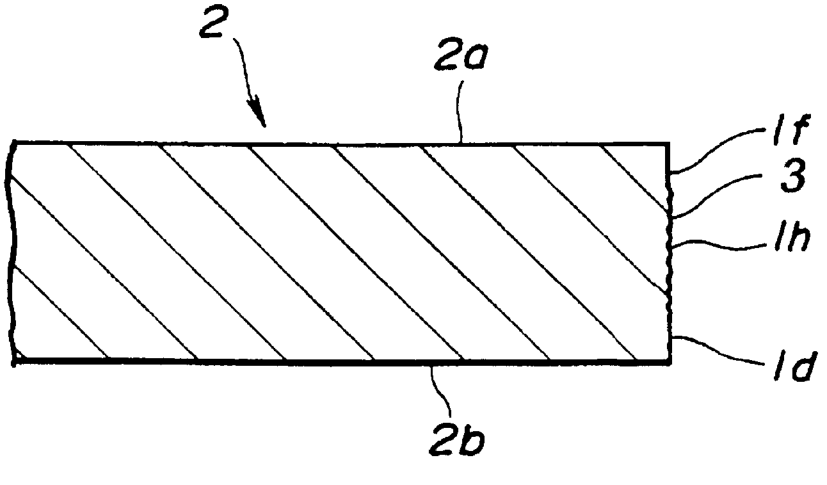
FIG. 20 is a cross-sectional elevational view of the base plate of FIG. 19 taken along line A—A thereof.

FIG. 19 is a perspective view of the base plate punched from the template 1 by the above-mentioned punching method, and FIG. 20 is a cross-sectional view taken along a line A—A of FIG. 19. Since the upper and lower ends of a punched end surface 3 of the base plate 2, are formed of the shear planes 1*f* and 1*d* which connect with the upper and lower surfaces 2*a* and 2*b* of the base plate 2, a punched flash is prevented from forming in the boundaries between the upper and the lower surfaces and the punched end surface. Accordingly, injuries are avoided in the base plate formed by the method of the present invention as a punched flash is not present in the finished base plate as in the finished base plate formed by punching methods illustrated in FIGS. 1 through 5.

In addition, a notched window 5 for a mirror is punched from the above-mentioned base plate 2. This notched window 4 is formed by the punching method according to the present invention.

Figure 21:
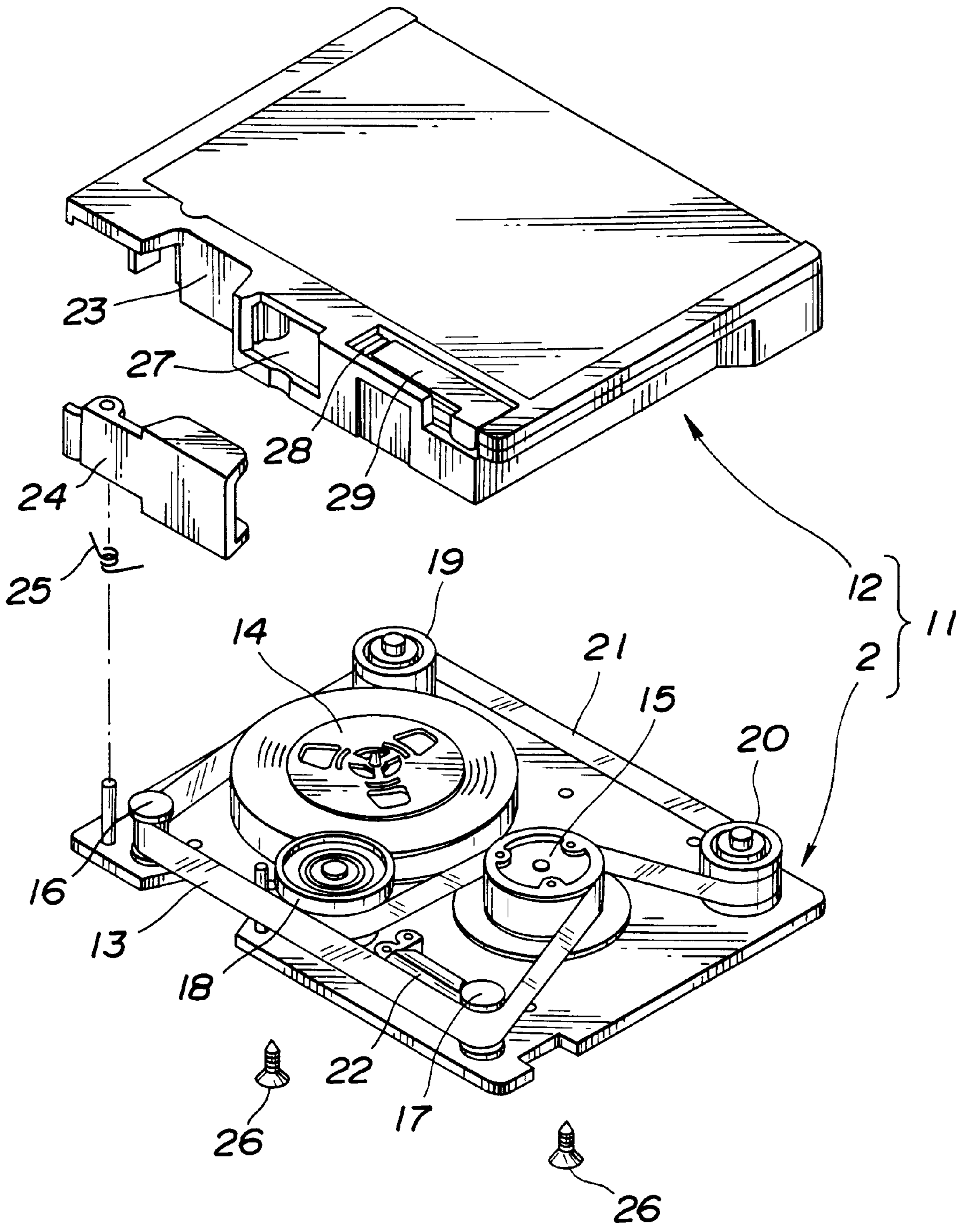
FIG. 21 is an exploded, front perspective view of a tape cassette utilizing the base plate of FIG. 19 formed by the method of punching a template of the present invention.

A tape cassette 11 used as an external storage medium of a computer which incorporates the above-mentioned base plate 2 formed by the method of the present invention is illustrated as in FIG. 21.

The above-mentioned tape cassette 11 includes the base plate 2 and a cover 12 made of transparent resin which is mounted on the base plate 2. The tape cassette further includes a pair of tape reels 14 and 15 around which a magnetic tape 13 is wound, a pair of tape guides 16 and 17, and a drive roller 18 provided between the pair of tape guides 16 and 17. First and second corner rollers 19 and 20 are provided on the opposite side of the drive roller 18 with a drive belt 21 stretched in an approximately triangular shape between the drive roller 18 and the first and second corner rollers 19 and 20. A mirror 22 is mounted facing the above-mentioned notched window 5 for detecting the end of the tape. In addition, a port lid 24 for opening or closing a head insertion port 23 provided for the cover 12, and a spring 25 for urging the port lid 24 in such a direction as to close the head insertion port 23 are assembled on the base plate 2.

A portion of the belt drive 21 positioned between the drive roller 18 and the first corner roller 19 is pressed against a peripheral surface of the magnetic tape 13 wound around the tape reel 14. In addition, a portion of the belt drive 21 positioned between the drive roller 18 and the second corner roller 20 of the drive belt 21 is pressed against a peripheral surface of the magnetic tape 13 wound around the other tape reel 15.

The above-mentioned cover 12 is mounted on the base plate 2 by fasteners 26, such as screws, etc., in order to cover the pair of tape reels 14 and 15, the pair of tape guides 16 and 17, the drive roller 18, the first and second corner rollers 19 and 20, the drive belt 21, and the like.

The above-mentioned head insertion port 23 is provided in one side portion of a front surface of the cover 12 with a notched window for exposing the drive roller 18 being provided in the center thereof. As is shown in FIG. 21, a recessed portion 28 for mounting an-error recording preventing member is provided on an upper surface of the other side portion of the front surface of the cover 12 with an error recording preventing member 29 being slidably mounted on the recessed portion 28.

Figure 22:
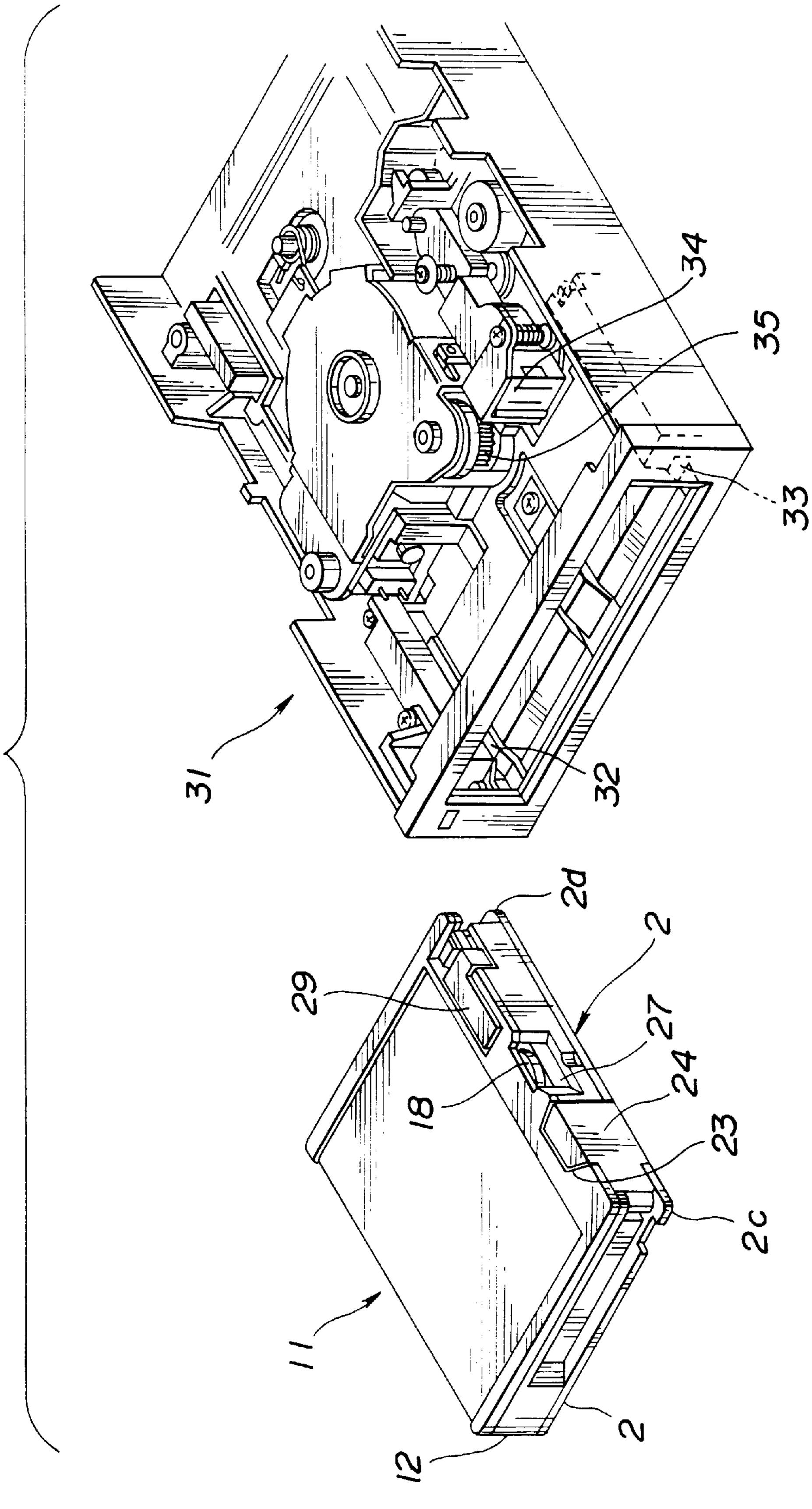
FIG. 22 is an exploded, front perspective view illustrating the finished tape cassette of FIG. 21 which is to be loaded into a drive.

As shown in FIG. 22, the above-mentioned tape cassette 11 is loaded into a drive 31 such that both side portions 2*c* and 2*d* of the base plate 2 are fitted into insertion guide portions 32 and 33 provided in both side portions of the drive 31. When the tape cassette 11 is loaded in the drive 31, the cover 24 is opened by a cover opening operating member (not shown) provided in the drive 31. Also, a magnetic head 34 of the drive 31 is introduced into the above-mentioned head insertion portion 23 and is brought into contact with the magnetic tape 13 and a drive capstan roller 35 of the drive 31 is brought into contact with the above-mentioned drive roller 18. When the drive capstan roller 35 of the drive 31 is rotated, the drive roller 18 is rotated, to in turn drive the drive belt 21 to cause the magnetic tape 13 to run, so that recording and reproduction on the magnetic tape 13 are achieved by the magnetic head 34.

Since the base plate 2 of the tape cassette 11 is formed by the punching method according to the present invention, as described above, no punched flash is formed on the end surfaces of both of the side portions which are fitted into the insertion guide portions 32 and 33 of the drive 31. Instead, the end surfaces are smooth. Therefore, when the tape cassette 11 is inserted into the drive 31, the insertion guide portions 32 and 33 of the drive 31 can both be prevented from being damaged by the end surfaces of both of the side portions of the base plate 2.

Based upon the foregoing, in accordance with the method of the present invention, a template is partially punched on a first surface thereof, and is then fully punched on a second surface thereof opposite to the first surface, to form a product to be punched. As a result thereof, the upper and lower ends of a punched end surface of the product to be punched form shear planes, and a portion of the punched end surface between the shear planes forms a fracture plane. However, the fracture plane is rubbed by an inner peripheral surface of a punched opening of the template, so that a punched flash or the like is naturally removed. Consequently, a flash crushing processing or the like of the punched member as in the punching operations of FIGS. 1 through 5 is unnecessary. Accordingly, by utilizing the present method, the cost of products can be reduced.

Moreover, in the base plate formed by the method of punching a template of the present invention, upper and lower ends of its punched end surface are formed of shear planes, and a punched flash is not formed in the upper and lower ends of the punched end surface. Accordingly, injuries to hands or the like are prevented in the base plate formed by the punching method of the present invention.

Further, when a tape cassette having a base plate formed by the present method is inserted in a drive, the drive is not damaged by the side portions of the base plate since no punched flash is present in the punched end surface thereof.

Although a preferred embodiment of the present invention and modifications thereof have been described in detail herein, it is to be understood that this invention is not limited to this embodiment and modifications, and that other modifications and variations may be affected by one skilled in the art without departing from the spirit and scope of the invention as defined in the appended claims. For example, although the drawings herein illustrate a base plate for a tape cassette being formed by the punching method of the present invention, this punching method is not limited to that particular application, as this method can be used in a variety of products which are punched from a template. Furthermore, the template can also include an anodic oxide film (an anodic oxide coating layer) and a protective film made of synthetic resin formed on its surface. In addition, the first returning step 60 can be performed simultaneously with the full punching step 70. Moreover, the second returning step 80 can be omitted so that the cut-off step 90 is performed after the full punching step 70.

It is intended that the appended claims be interpreted as including the foregoing as well as various other such changes and modifications.

What is claimed is:

1. A base plate for a computer data cartridge formed by punching a template, wherein a punched end surface of the base plate formed by punching the base plate from the template which comprises a first sheer plane connected with a first surface of a base plate, a second shear plane connected with a second surface of said base, and a first fracture plane interposed between said first and second shear plane wherein said shear planes and said fracture plane are formed by first partially punching the template on a first side thereof and then fully punching the template on a second side thereof opposite to said first side; and wherein a punched flash is not formed at the connection between said first and second surfaces of said base plate and said respective first and second shear planes as an occurrence of a punched flash is naturally removed as a result of the fracture plane being subsequently rubbed by an inner peripheral surface of a punched opening of the template.

2. The base plate for a computer data cartridge formed by punching a template of claim 1 wherein the base plate includes a notched window for mounting a mirror which is formed by punching; and a punched end surface of the notched window formed by said punching comprises a third shear plane connected with a first surface of said base plate, a fourth shear plane connected with a second surface of said base plate, and a second fracture plane interposed between said third and fourth shear planes; and wherein a punched flash is not formed at the connection between said first and second surfaces of said base plate and said respective third and fourth shear planes.

* * * * *